(12) United States Patent
Li et al.

(10) Patent No.: US 11,789,560 B2
(45) Date of Patent: Oct. 17, 2023

(54) TOUCH PANEL, DISPLAY PANEL AND DISPLAY DEVICE

(71) Applicants: Chongqing BOE Display Technology Co., Ltd., Chongqing (CN); BOE Technology Group Co., Ltd., Beijing (CN)

(72) Inventors: Jie Li, Beijing (CN); Wei Zhang, Beijing (CN); Teng Chen, Beijing (CN); Huaisen Ren, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/506,557

(22) Filed: Oct. 20, 2021

(65) Prior Publication Data
US 2022/0300115 A1   Sep. 22, 2022

(30) Foreign Application Priority Data
Mar. 19, 2021   (CN) .......................... 202110295523.3

(51) Int. Cl.
G06F 3/044   (2006.01)
G06F 3/041   (2006.01)

(52) U.S. Cl.
CPC ........ *G06F 3/04164* (2019.05); *G06F 3/0412* (2013.01); *G06F 3/0443* (2019.05); *G06F 3/0446* (2019.05)

(58) Field of Classification Search
CPC .. G06F 3/0412; G06F 3/04164; G06F 3/0443; G06F 3/0446; G06F 2203/04103
See application file for complete search history.

(56) References Cited

U.S. PATENT DOCUMENTS

| 2012/0262419 A1* | 10/2012 | Hershman | G06F 3/0443 |
| | | | 345/174 |
| 2021/0303093 A1* | 9/2021 | Cao | G02F 1/133345 |
| 2022/0146874 A1* | 5/2022 | Yoshida | G06F 3/04164 |

FOREIGN PATENT DOCUMENTS

| CN | 107045412 B | * | 5/2020 | ........... G06F 3/0412 |
| CN | 112860123 A | * | 5/2021 | ........... G06F 3/0412 |

* cited by examiner

*Primary Examiner* — Julie Anne Watko
(74) *Attorney, Agent, or Firm* — IPRO, PLLC (57) ABSTRACT

The disclosure discloses a touch panel, a display panel and a display device. A plurality of touch electrodes, a bonding region and a plurality of touch wires are included, where one touch wire is electrically connected to one touch electrode; and a touch group is formed by an ith touch electrode and an n-i+1th touch electrode in a touch electrode column, touch wires electrically connected to two touch electrodes in a same touch group are arranged adjacently.

14 Claims, 6 Drawing Sheets

Fig. 1

--Prior Art--

Fig. 2

--Prior Art--

TOUCH PANEL, DISPLAY PANEL AND DISPLAY DEVICE

CROSS REFERENCE TO RELATED APPLICATIONS

The present disclosure claims priority to Chinese Patent Application No. 202110295523.3, filed with the China National Intellectual Property Administration on Mar. 19, 2021, the content of which is incorporated herein by reference in its entirety.

FIELD

The present disclosure relates to the field of the display technology, and particularly to a touch panel, a display panel and a display device.

BACKGROUND

With continuous development of the display technology, display panels generally have a touch function. Touch panels may be classified into resistance-sensitive and capacitance-sensitive touch panels, and the capacitance-sensitive touch panels are widely used due to the characteristics of low cost, ability to achieve actual multi-point touch, fast reaction speed or the like.

Currently, touch display technologies applied to Organic Light-Emitting Diode (OLED) display panels have evolved from previous external touch pads to direct integration on the display panels, from mutual-capacitance type touch technologies to self-capacitance type touch technologies. A mutual-capacitance type touch panel has a greater RC delay compared to self-capacitance type touch panel, and a parasitic capacitance of the mutual-capacitance type touch panel is increased geometrically with an increase in the size of the touch panel, while a parasitic capacitance of the self-capacitance touch panel is almost unchanged.

However, as the size of the touch panel is increasingly larger, the load for the wire connected to self-capacitance electrode is increasingly greater. In order to reduce the load for the wire, the thickness of the wire needs to be increased, but in this way, shorting between the wire and other self-capacitance electrodes is easily caused, resulting in reduction of a product yield.

SUMMARY

Embodiments of the present disclosure provide a touch panel, a display panel and a display device.

In a first aspect, an embodiment of the present disclosure provides a touch panel, including: a plurality of touch electrodes, the touch electrodes being arranged in a first direction to form a plurality of touch electrode columns, the plurality of touch electrode columns being arranged in a second direction, and the first direction and the second direction being intersected; a bonding region located on a side of the touch electrodes in the first direction; and a plurality of touch wires, one touch wire being correspondingly electrically connected to one touch electrode. The touch wires each extend in the first direction, and are respectively electrically connected to the bonding region; a length, in the first direction, of a touch wire electrically connected to a touch electrode closer to the bonding region being less than a length, in the first direction, of a touch wire electrically connected to a touch electrode further away from the bonding region; where each of the touch electrode columns includes n touch electrodes, a touch group is formed by an ith touch electrode and an n-i+1th touch electrode in a sequence from near to far from the bonding region, and touch wires electrically connected to two touch electrodes in a same touch group are arranged adjacently; and n is an integer greater than or equal to 1, and i is an integer from 1 to n, respectively.

In a second aspect, an embodiment of the present disclosure provides a display panel, including the above touch panel, and further including: a base substrate; a driving line layer located on a side of the base substrate; an electroluminescent layer located on a side, away from the base substrate, of the driving line layer; an encapsulation layer located on a side, away from the driving line layer, of the electroluminescent layer. The touch panel is located on a side, away from the electroluminescent layer, of the encapsulation layer, and includes: an isolation layer located on a side, away from the electroluminescent layer, of the encapsulation layer; a first touch metal layer located on a side, away from the encapsulation layer, of the isolation layer; a touch insulating layer located on a side, away from the isolation layer, of the first touch metal layer; a second touch metal layer located on a side, away from the first touch metal layer, of the touch insulating layer; and a touch protection layer located on a side, away from the touch insulating layer, of the second touch metal layer. The touch wires are located in the first touch metal layer, the touch electrodes are located in the second touch metal layer, and the touch wires are correspondingly electrically connected to the corresponding touch electrodes through via holes of the touch insulating layer.

In a third aspect, an embodiment of the present disclosure provides a display device including the above display panel.

BRIEF DESCRIPTION OF THE DRAWINGS

In order to more clearly illustrate the technical solutions of embodiments of the present disclosure, the drawings required to be used in embodiments of the present disclosure will be briefly described below, and it will be apparent that the drawings described below are merely some embodiments of the present disclosure and that those of ordinary skill in the art can obtain other drawings from these drawings without creative work.

DETAILED DESCRIPTION

In order to make the above objects, features and advantages of the present disclosure be more readily understood, the present disclosure will now be further described with reference to the drawings and embodiments. However, embodiments may be implemented in many forms and should not be construed as the limitation to embodiments set forth herein; and on the contrary, these embodiments are provided so that the present disclosure is thorough and complete, and will fully convey the concept of embodiments to those skilled in the art. The same reference numerals in the drawings denote the same or similar structures, and thus repeated description thereof will be omitted. Words expressing positions and directions described in the present disclosure are illustrated by way of examples in the drawings, but changes may be made according to demands and are within the protective scope of the present disclosure. The drawings of the present disclosure are only used to illustrate relative positional relationships and do not represent true scales.

Current touch panels may be divided into a mutual-capacitance type touch panel and a self-capacitance touch panel. Compared to the mutual-capacitance type touch panel, the self-capacitance type touch panel has the advantages of low RC delay, high report rate, and high signal to noise ratio or the like. With an increase in the size of the touch panel, a parasitic capacitance produced between mutual capacitances of the mutual-capacitance type touch panel is increased geometrically, while a parasitic capacitance of the self-capacitance type touch panel is almost unchanged, and thus the self-capacitance type touch panel has significant advantages in display products with medium and large sizes.

Touch electrodes and touch wires of the current self-capacitance type touch panel may use either single-layer metal or double-layer metal. The single-layer metal is generally suitable to use in panels with small sizes as a touch blind region may be produced in a region where the touch wires are connected; and although the double-layer metal may be used to eliminate the blind touch region, the double-layer metal also produces a problem of greater load.

Figure 1:
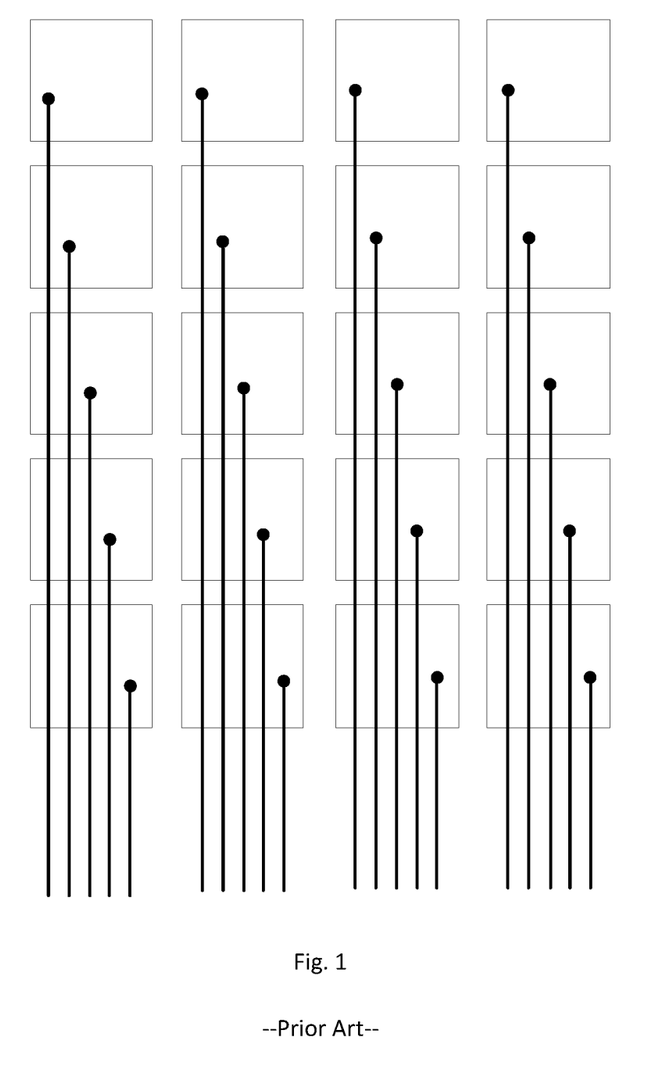
FIG. 1 is a first plane view of a touch panel in the related art.
Figure 2:
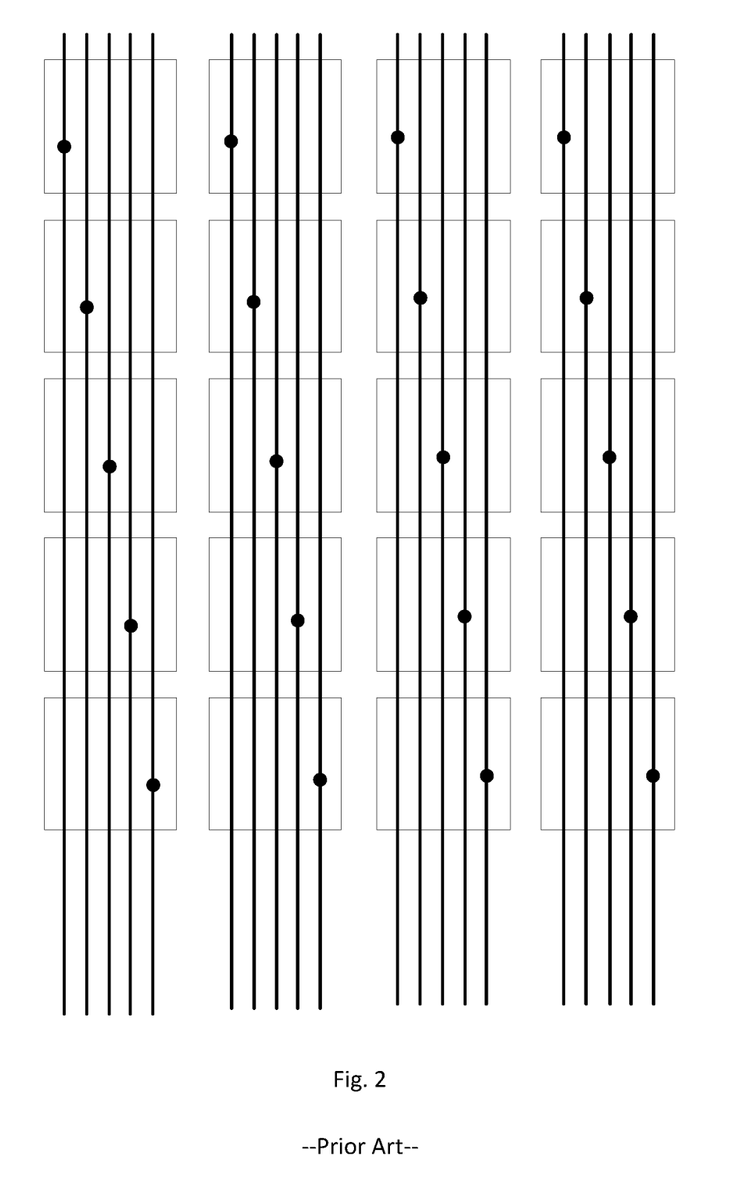
FIG. 2 is a second plane view of a touch panel in the related art.

FIGS. 1 and 2 are two touch wire distributions used in the related art. FIG. 1 shows a non-through type touch wire design, where the lengths of the touch wires are not identical, and the touch wire with a greater length has a greater load than the touch wire with a shorter length. FIG. 2 shows a through type touch wire design, where the touch wires are identical in length, resulting in an increase in the load for the touch wires.

In order to avoid increasing the load, the thicknesses of the touch wires are increased, and thus edges of the touch wires are sharper, so that an insulating layer is severed so as to result in electrical connections between the touch wires and other touch electrodes in addition to electrical connections between the touch wires and corresponding touch electrodes, thus forming a shorting phenomenon. Particularly, when applied to panels with large sizes, the increase in the quantity of the touch electrodes is cumbersome for testing, resulting in reduction of a product yield and increase in production costs.

In view of this, an embodiment of the present disclosure provides a touch panel used to reduce the load for the touch wires and improve the product yield.

Figure 3:
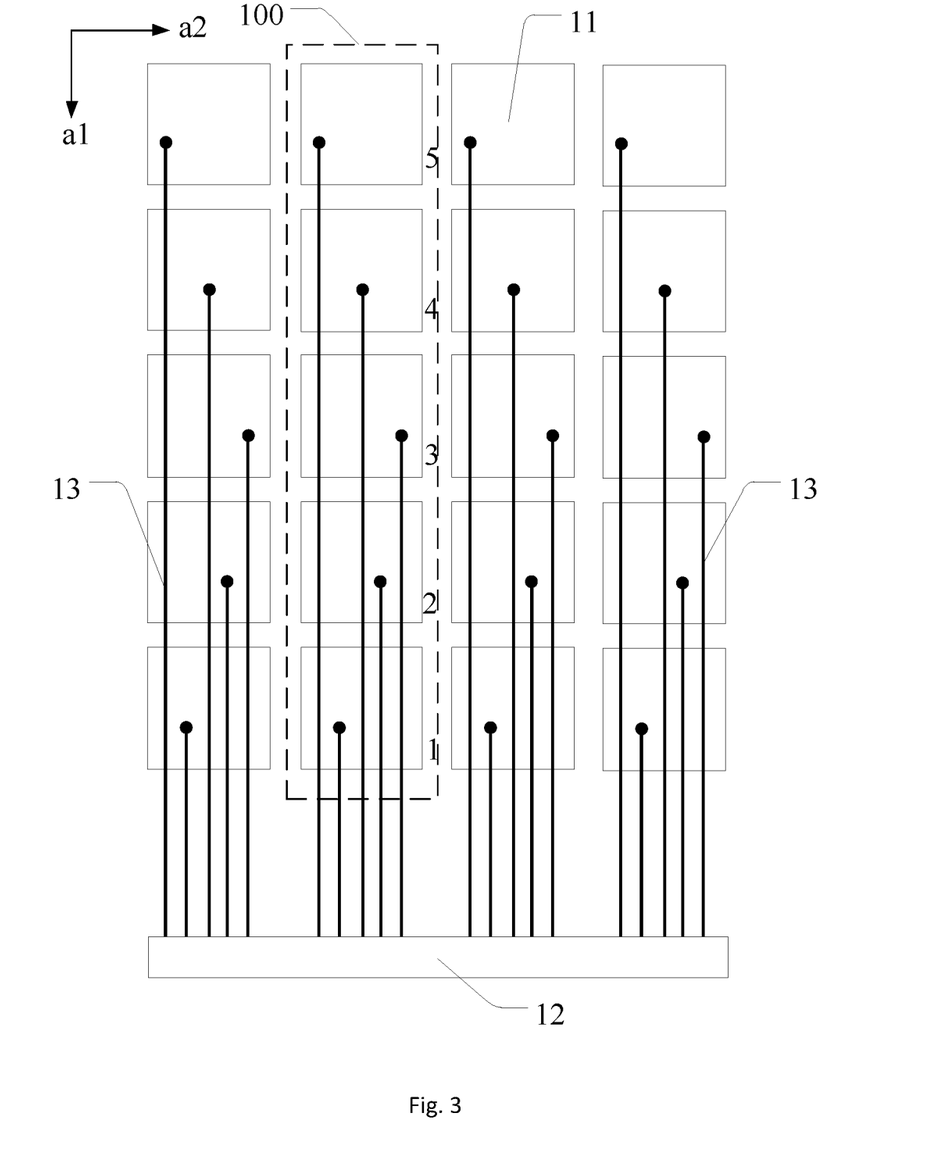
FIG. 3 is a plane view of a touch panel provided by an embodiment of the present disclosure.

FIG. 3 is a plane view of a touch panel provided by an embodiment of the present disclosure.

As shown in FIG. 3, the touch panel includes a plurality of touch electrodes 11, a bonding region 12 and a plurality of touch wires 13.

The touch electrodes 11 are arranged in a first direction a1 to form a plurality of touch electrode columns 100, the plurality of touch electrode columns are arranged in a second direction a2, and the first direction a1 and the second direction a2 are intersected.

In some embodiments, the first direction a1 may be a vertical direction of the touch panel, the second direction a2 may be a horizontal direction of the touch panel, the first direction a1 and the second direction a2 are perpendicular to each other, and the touch electrodes 11 are arranged in an array along the first direction a1 and the second direction a2.

The bonding region 12 is located on a side of all of the touch electrodes 11 in the first direction a1. The touch panel may be divided into a display region and a non-display region, and the non-display region is located around the display region. The touch electrodes 11 are generally arranged in the display region, and the bonding region 12 is located in the non-display region on a side of the display region. A touch chip is generally arranged in the bonding region 12, and is configured to receive a detection signal from each of the touch electrodes to determine a position at which the touch occurs.

One touch wire 13 is correspondingly electrically connected to one touch electrode 11; the touch wires 13 extend in the first direction a1 and are electrically connected to the bonding region 12, respectively; and length, in the first direction a1, of a touch wire electrically connected to a touch electrode 11 closer to the bonding region 12 is less than a length, in the first direction a1, of a touch wire 13 electrically connected to a touch electrode 11 further away from the bonding region 12.

Each touch electrode 11 is connected to the bonding region 12 through a touch wire 13 electrically connected thereto, and a touch signal detected by a touch electrode 11 may be transmitted via the touch wire 13 connected with the touch electrode to a touch chip in the bonding region 12, and the touch chip determines a position where the touch occurs according to the received touch signal to perform a corresponding operation.

As shown in FIG. 3, each of the touch electrode columns 100 includes n touch electrodes 11, a touch group is formed by an ith touch electrode and an n-i+1th touch electrode in a sequence from near to far from the bonding region 12, touch wires electrically connected to two touch electrodes in a same touch group are arranged adjacently; and n is an integer greater than or equal to 1, and i is an integer from 1 to n, respectively.

For facilitating illustration, a touch electrode column 100 in FIG. 3 includes five touch electrodes 11, i.e., n=5. The five touch electrodes in the touch electrode column 100 are numbered 1 to 5 based on the sequence from near to far from the bonding region 12. When 1=1, n-i+1=5, i.e., the first touch electrode and the fifth touch electrode constitute a touch group; when 1=2, n-i+1=4, i.e., the second touch electrode and the fourth touch electrode constitute a touch group; when i=3, n-i+1=3, i.e., the third touch electrode individually constitutes a touch group. That is, in an embodiment of the present disclosure, a middle touch electrode in the touch electrode column 100 individually constitutes a touch group, two touch electrodes located on two sides of the middle touch electrode 100 constitute a touch group, and in the same manner, the touch electrodes in the entire column are grouped accordingly. FIG. 3 is merely used to illustrate the grouping rule, in an practical application, if an even number of touch electrodes are included in a touch electrode column 100, two touch electrodes in the middle constitute a touch group, two touch electrodes on two sides of touch group in the middle constitute a touch group, and in the same manner, touch electrodes in the entire column are grouped accordingly.

In some embodiments, after the touch electrodes 11 in the touch electrode column 100 are grouped, the touch wires electrically connected to the touch electrodes included in the same touch group are arranged adjacently. As shown in FIG. 3, when such a wire distribution design is adopted, the touch wire electrically connected to the touch electrode further away from the bonding region 12 is longer, the touch wire electrically connected to the touch electrode closer to the bonding region 12 is shorter, and the longer touch wire and the shorter touch wire are arranged adjacently, so that the interference between the touch wires may be reduced to a certain extent, and the distance between the longer touch wire and the shorter touch wire is shortened.

Figure 4:
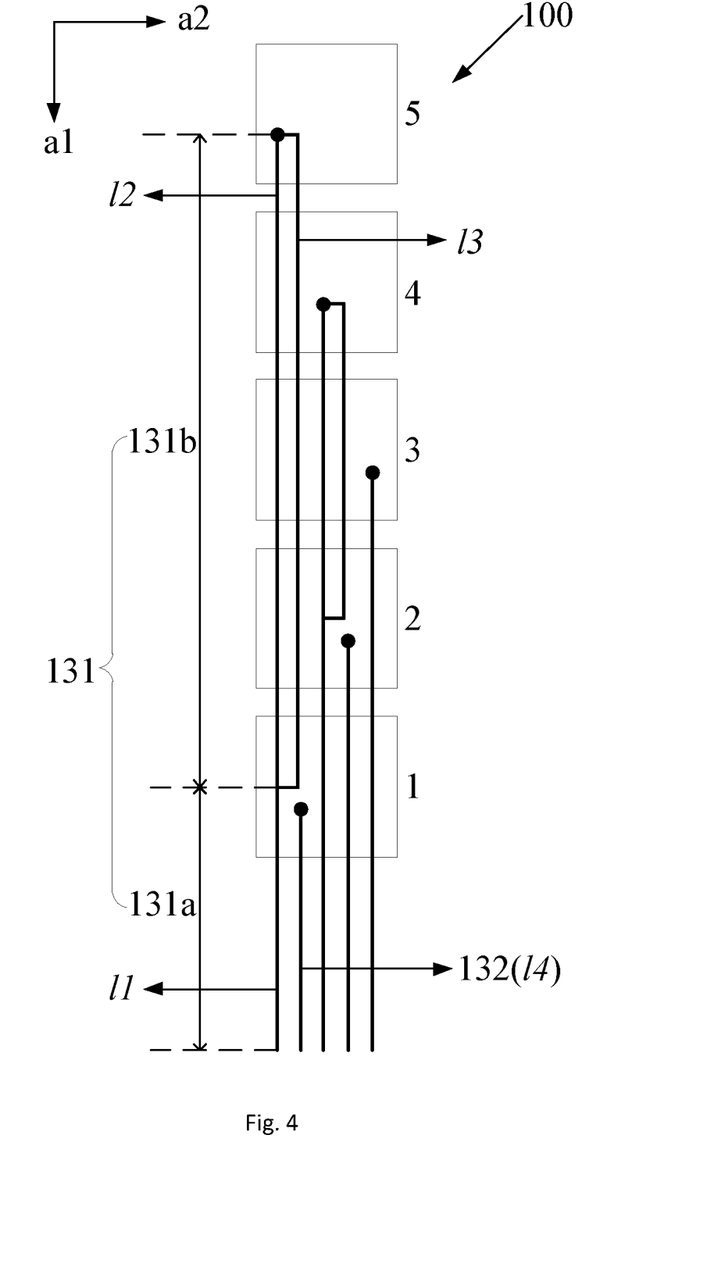
FIG. 4 is a first plane view of a touch electrode column provided by an embodiment of the present disclosure.
Figure 5:
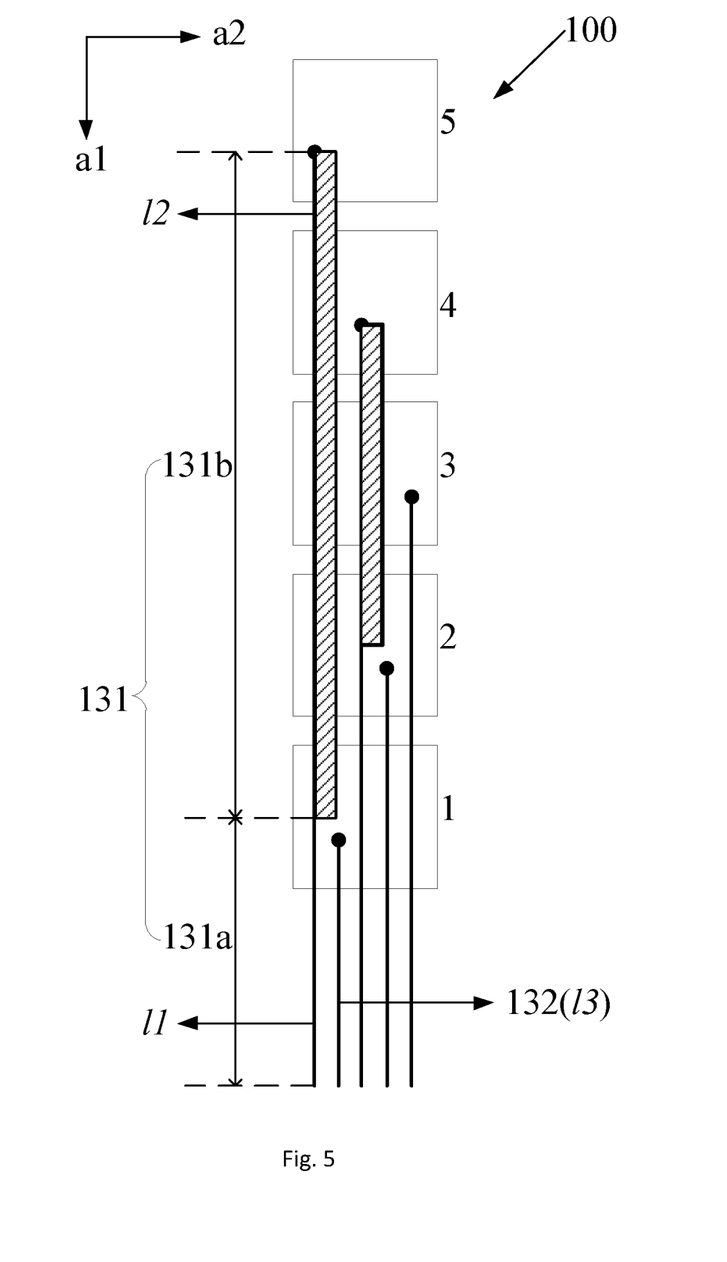
FIG. 5 is a second plane view of a touch electrode column provided by an embodiment of the present disclosure.

FIGS. 4 and 5 are plan views of a touch electrode column provided by embodiments of the present disclosure.

As shown in FIG. 4 or FIG. 5, in the same touch group, a touch wire electrically connected to a touch electrode further away from the bonding region is a first touch wire 131, and a touch wire electrically connected to a touch electrode closer to the bonding region is a second touch wire 132; the first touch wire 131 includes a first wire portion 131a and a second wire portion 131b, the first wire portion 131a is electrically connected to the second wire portion 131b, a width of the first wire portion 131a in the second direction a2 is less than a width of the second wire portion 131b in the second direction a2.

For each touch group, the length of the first touch wire 131 is greater than the length of the second touch wire 132, and therefore the resistance of the first touch wire 131 is greater than the resistance of the second touch wire 132, i.e., the load for the first touch wire 131 is greater. To reduce the load for the longer touch wire, in an embodiment of the present disclosure, the first touch wire 131 is divided into the first wire portion 131a and the second wire portion 131b that are electrically connected, where the first wire portion 131a is adjacent to the second touch wire 132. Since the second touch wire 132 is shorter, and there is no wire arranged at a position adjacent to the second wire portion 131b, a space at the position adjacent to the second wire portion 131b may be utilized to increase the width of the second wire portion 131b, and thus, the overall resistance of the first touch wire 131 is reduced to reduce the load for the first touch wire 131, so as to make the loads for the first touch wire 131 and the second touch wire 132 relatively balanced, thereby reducing the signal delay of the first touch wire 131.

FIG. 4 is a plane view of a touch electrode column provided by an embodiment of the present disclosure.

In some embodiments, as shown in FIG. 4, the first wire portion 131a includes a lead (l1) extending in the first direction a1; and the second wire portion 131b includes two leads (l2 and l3) extending in the first direction a1, and the two leads (l2 and l3) included in the second wire portion 131b are connected in parallel.

In each touch group, a lead is additionally arranged at a position unoccupied by the second touch wire 132, and is in parallel connected to the original first touch wire 131, so that the resistance of the first touch wire 131 may be reduced to reduce the load for the first touch wire 131, so as to make the loads for the first touch wire 131 and the second touch wire 132 relatively balanced, thereby reducing the signal delay of the first touch wire 131.

As shown in FIG. 4, the second wire portion 131b includes the two leads (l2 and l3) having equal widths in the second direction a2. The widths of the two leads connected in parallel in the second wire 131b are equal, so that the etching difficulty when the leads are made is lowered. However, in some embodiments, in order to balance the difference in the resistance of the touch wires, it is also possible to set that the widths of the two leads in the second wire portion 131b are not equal, which is not limited herein.

As shown in FIG. 4, the lead (l1) included in the first wire portion 131a and the leads (l2 and l3) included in the second wire portion 131b are equal in width in the second direction a2. The same width adopted by the three leads included in the first touch wire 131 may lower the etching difficulty of the first touch wire 131. Therefore, the overall resistance of the first touch wire 131 may thereby be changed by changing the length of the lead (l3) in parallel connected to the first touch wire 131.

FIG. 5 is a plane view of a touch electrode column provided by an embodiment of the present disclosure.

In some embodiments, as shown in FIG. 5, the first wire portion 131a includes a lead (l1) extending in the first direction a1; the second wire portion 131b includes a lead (l2) extending in the first direction a1; and the width of the lead (l1) included in the first wire portion 131a in the second direction a2 is less than the width of the lead (l2) included in the second wire portion 131b in the second direction a2.

The first wire section 131a is adjacent to the second touch wire 132. Since the second touch wire 132 is shorter, and there is no wire arranged at a position adjacent to the second wire portion 131b, a space at the position adjacent to the second wire portion 131b may be utilized to increase the width of the second wire portion 131b, and thus, the overall resistance of the first touch wire 131 is reduced to reduce the load for the first touch wire 131, so as to make the loads for the first touch wire 131 and the second touch wire 132 relatively balanced, thereby reducing the signal delay of the first touch wire 131.

In some embodiments, two widths are set for the first touch wire 131, where the width of the first wire portion 131a is equal to the width of the second touch wire 132, and the width of the second wire portion 131b is greater than the width of the first wire portion 131a, so that the space unoccupied by the second touch wire 132 is reasonably utilized, the resistance of the first touch wire 131 is reduced, and the signal delay of the first touch wire 131 is reduced.

Figure 6:
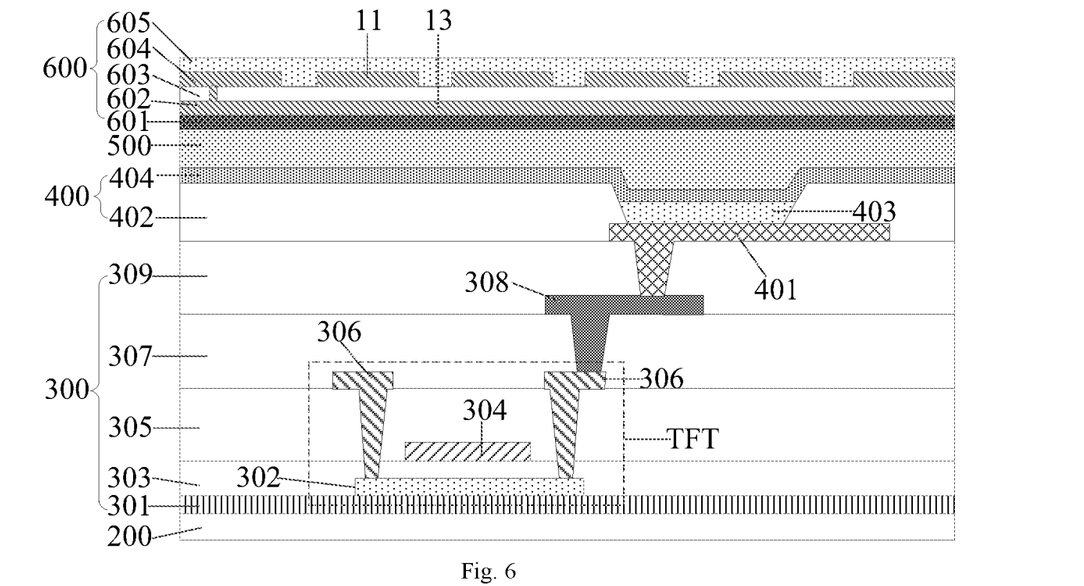
FIG. 6 is a sectional view of a display panel provided by an embodiment of the present disclosure.

FIG. 6 is a sectional view of a display panel provided by an embodiment of the present disclosure.

As shown in FIG. 6, the display panel includes a base substrate 200, a driving line layer 300, an electroluminescent layer 400, an encapsulation layer 500 and a touch panel 600.

The base substrate 200 has a supporting and carrying function.

The driving line layer 300 is located on the base substrate 200, and is configured to provide a driving signal for a pixel unit.

The electroluminescent layer 400 is located on a side, away from the base substrate 200, of the driving line layer 300.

The above display panel provided by an embodiment of the present disclosure may be an OLED display panel in which an organic light-emitting diode device serves as a pixel unit for image display.

The encapsulation layer 500 is located on a side, away from the driving line layer 300, of the electroluminescent layer 400. The encapsulation layer 500 has a structure in which inorganic layers and organic layers are alternately stacked, and is configured to encapsulate the organic light-emitting diode device while preventing water and oxygen from entering the organic light-emitting diode device.

The touch panel 600 is located on a side, away from the electroluminescent layer 400, of the encapsulation layer 500.

In an embodiment of the present disclosure, touch electrodes may be formed by employing a FMLOC process to fabricate metal grids directly on the encapsulation layer 500, without the need for external touch devices, which can reduce the overall thickness of the display panel, and is suitable for flexible display panels. A display panel fabricated using the technique does not suffer from the problem of fitting tolerances and can further reduce the width of a frame.

As shown in FIG. 6, the driving line layer 300 includes the following portions.

A buffer layer 301 is located on the base substrate 200. The buffer layer 301 can match a stress between the base substrate 200 and a film layer above, and can also improve the sealing performance of the display panel. The buffer layer 301 may be fabricated by using an inorganic material, which is not limited herein.

An active layer 302 is located on a side, away from the base substrate 200, of the buffer layer 301. The Active layer 302 is a functional film layer for fabricating a thin film transistor, and has a preset pattern. The active layer 302 includes a source region and a drain region formed by doping N-type or P-type ions, where a region between the source region and the drain region is a channel region that is not doped.

A gate insulating layer 303 is located on a side, away from the buffer layer 301, of the active layer 302. The gate insulating layer 303 is configured to insulate a metal layer above the active layer 302. The gate insulating layer 303 may use a material such as silicon oxide or silicon nitride, which is not limited herein.

A gate metal layer 304 is located on a side, away from the active layer 302, of the gate insulating layer 303. The gate metal layer 304 has a pattern including a gate and a gate line. The gate metal layer 304 may have a single-layer metal structure or a multi-layer metal stacked structure, which is not limited herein.

An interlayer insulating layer 305 is located on a side, away from the gate insulating layer 303, of the gate metal layer 304. The interlayer insulating layer 305 is configured to insulate the metal layer above the gate metal layer 304. The gate insulating layer 303 may use a material such as silicon oxide or silicon nitride, which is not limited herein.

A first source-drain metal layer 306 is located on a side, away from the gate metal layer 304, of the interlayer insulating layer 305. The first source-drain metal layer 306 has a pattern including a source, a drain, and a power signal line.

A first planarization layer 307 is located on a side, away from the interlayer insulating layer 305, of the first source-drain metal layer 306. The first planarization layer 307 is configured to insulate the first source-drain metal layer 306 while planarizing a surface of the film layer to facilitate formation of other devices on the first planarization layer 307. The first planarization layer 307 may be fabricated by using a material such as silicon oxide or silicon nitride, which is not limited herein.

A second source-drain metal layer 308 is located on a side, away from the first source-drain metal layer 306, of the first planarization layer 307. The second source-drain metal layer 308 has a pattern including a data line.

A second planarization layer 309 is located on a side, away from the first planarization layer 307, of the second source-drain metal layer 308. The second planarization layer 309 is configured to insulate the second source-drain metal layer 308 while planarizing the surface of the film layer to facilitate formation of other devices on the second planarization layer 309. The second planarization layer 309 may be fabricated by using a material such as silicon oxide or silicon nitride, which is not limited herein.

The gate, source, and drain control a Thin Film Transistor (TFT).

After the above driving line layer 300 is formed on the base substrate 200, the electroluminescent layer 400 is fabricated on the driving line layer 300. The electroluminescent layer 400 includes the following portions.

A first electrode layer 401 is located on a side, away from the second source-drain metal layer 308, of the second planarization layer 309. The first electrode layer 401 includes a plurality of mutually discrete first electrodes, where each first electrode is electrically connected to a drain of the thin film transistor below through via holes of the first planarization layer 307 and the second planarization layer 309 to transmit a driving signal to the first electrode. The first electrode layer 401 may use a transparent conductive material such as indium tin oxide, which is not limited herein.

A pixel defining layer 402 is located on a side, away from the second source-drain metal layer 308, of the second planarization layer 309, and is located at a spaced position between the first electrodes. The pixel defining layer 402 is configured to separate regions where the first electrodes are located, and has a greater thickness than the first electrode layer 401 and other organic functional film layers.

Light-emitting layers 403 are located on a side, away from the second planarization layer 309, of the first electrodes. The light-emitting layers 403 formed on different first electrodes may use the same material or different materials. In the display panel provided by an embodiment of the present disclosure, the light-emitting layers 403 may use organic light-emitting materials emitting different colors, the light-emitting layers are formed only on the corresponding first electrodes; or, the light-emitting layers 403 may be formed by using an organic light-emitting material for emitting white light, the light-emitting layers are provided as a whole, and a color film substrate is also arranged, so as to emit light with different colors.

A second electrode layer 404 is located on a side, away from the second planarization layer 309, of the light-emitting layer 403. The second electrode layer 404 is provided as a whole, and the second electrode layer 404 may use a conductive material such as metallic silver, which is not limited herein.

The first electrode layer, the light-emitting layer, and second electrode layer constitute an organic light-emitting diode device.

When a voltage is applied to the first electrode layer 401 and the second electrode layer 404, holes and electrons are compounded to form excitons in the light-emitting layer to excite a light-emitting material in the light-emitting layer 403 to emit light.

After the above electroluminescent layer 400 is formed on the driving line layer 300 on the base substrate, the encapsulation layer 500 is formed on the surface of the electroluminescent layer 400, where the encapsulation layer closest to the electroluminescent layer 400 is an inorganic layer, which may act to prevent water and oxygen from entering the electroluminescent layer 400, and an organic layer is added to the inorganic layer, which may act to relieve stress.

After the encapsulation layer 500 is formed, the touch panel 600 is fabricated on the encapsulation layer 500. The touch panel 600 includes the following portions.

An isolation layer 601 is located on a surface of a side, away from the electroluminescent layer 400, of the encapsulation layer 500. The isolation layer 601 acts as a barrier between an organic light-emitting diode device layer and the touch electrodes. The isolation layer 601 may be fabricated by using an inorganic material, which is not limited herein.

A first touch metal layer 602 is located on a surface of a side, away from the encapsulation layer 500, of the isolation layer 601; a touch insulating layer 603 is located on a surface of a side, away from the isolation layer 601, of the first touch metal layer 602; and a second touch metal layer 604 is located on a surface of a side, away from the first touch metal layer 602, of the touch insulating layer 603. The first touch metal layer 602 and the second touch metal layer 604 are metal layers configured to implement the touch panel, and the two metal layers are insulated by the touch insulating layer 603.

A touch protection layer 605 is located on a surface of a side, away from the touch insulating layer 603, of the second touch metal layer 604. The touch protection layer 605 acts to protect the touch electrodes in an insulation manner. The touch protection layer 605 may be fabricated by using an organic material, which is not limited herein.

Touch wires 13 are located in the first touch metal layer 602 and touch electrodes 11 are located in the second touch metal layer 604, the touch wires 13 are electrically connected to corresponding touch electrodes 11 through via holes of the touch insulating layer 603.

In an embodiment of the present disclosure, the first touch metal layer 602 and the second touch metal layer 604 may each be formed using a deposition process. Generally, the first touch metal layer 602 and the second touch metal layer 604 may adopt stacked three layers of metal, i.e., Ti/Al/Ti, and the first touch metal layer 602 and the second touch metal layer 604 are equal in thickness, which is in a range of 3,000 angstrom to 5,000 angstrom.

In an embodiment of the present disclosure, the longer touch wire is arranged to be adjacent to the shorter touch wire, and the longer touch wire is widened at the space unoccupied by the shorter touch wire, thereby reducing the resistance of the longer touch wire. Therefore, the thicknesses of the touch wires do not need to be increased, and the phenomenon of shorting between the touch wires and non-corresponding touch electrodes is avoided, thereby improving a product yield.

As shown in FIG. 3, when fabricating the touch panel 600, a pattern of the touch wires 13 is formed in the first touch metal layer 602, and then is covered with the touch insulating layer 603, a pattern of the touch electrodes 11 and connection lines located in the bonding region is formed in the second touch metal layer 604, the touch wires are electrically connected through the via holes to the corresponding touch electrodes and corresponding connection lines. Therefore, the touch wires may be connected to a touch chip located in the bonding region via the corresponding connection lines and transmit signals of the touch electrodes to the touch chip for control and processing.

Based on the same inventive concept, an embodiment of the present disclosure also provides a display device including the above display panel. Since the principle for solving the problems of the display device is similar to that of the above display panel, an implementation of the display device can refer to the implementation of the above display panel, and repeated parts are not described in detail.

According to the touch panel, the display panel and the display device provided by embodiments of the present disclosure, the plurality of touch electrodes, the bonding region, and the plurality of touch wires are included, one touch wire is correspondingly electrically connected to one touch electrode; the touch wires are respectively electrically connected to the bonding region; the length of the touch wire electrically connected to the touch electrode closer to the bonding region is less than the length of the touch wire electrically connected to the touch electrode further away from the bonding region; a touch group is formed by an ith touch electrode and an n-i+1th touch electrode in the same touch electrode column, and the touch wires electrically connected to the two touch electrodes in the same touch group are arranged adjacently. To reduce the load for the longer touch wire, the longer touch wire is divided into the first wire portion and the second wire portion which are electrically connected, the first wire portion is adjacent to the shorter touch wire, the longer touch wire occupies the space unoccupied by the shorter touch wire to increase the width of the longer touch wire at the position, so that the overall resistance of the longer touch wire is reduced to reduce the load for the longer touch wire, so as to make the loads for the two touch wires relatively balanced, thereby reducing the signal delay of the longer touch wire.

Although embodiments of the present disclosure have been described, those skilled in the art can make variations and modifications to these embodiments once the basic inventive concept is known. Therefore, the appended claims intend to be construed to include embodiments and all variations and modifications that fall within the scope of the present disclosure.

Obviously, those skilled in the art can make various modifications and variations can to the present disclosure without departing from the spirit and scope of the present disclosure. Thus, the present disclosure intends to include the modifications and variations if the modifications and variations come within the scope of the claims and equivalent technologies thereof

What is claimed is:
1. A touch panel, comprising:
a plurality of touch electrodes, the touch electrodes being arranged in a first direction to form a plurality of touch electrode columns, the plurality of touch electrode columns being arranged in a second direction, and the first direction and the second direction being intersected;
a bonding region located on a side of the touch electrodes in the first direction; and
a plurality of touch wires, one touch wire being correspondingly electrically connected to one touch electrode; the touch wires extending in the first direction, and being respectively electrically connected to the bonding region; a length, in the first direction, of a touch wire electrically connected to a touch electrode closer to the bonding region being less than a length, in the first direction, of a touch wire electrically connected to a touch electrode further away from the bonding region; wherein,
each of the touch electrode columns comprises n touch electrodes, a touch group is formed by an ith touch electrode and an n-i+1th touch electrode in a sequence from near to far from the bonding region, and touch wires electrically connected to two touch electrodes in a same touch group are arranged adjacently; and n is an integer greater than or equal to 2, and i is an integer from 1 to n, respectively;
wherein in the same touch group, a touch wire electrically connected to a touch electrode further away from the bonding region is a first touch wire, and a touch wire electrically connected to a touch electrode closer to the bonding region is a second touch wire; and the first touch wire comprises a first wire portion and a second wire portion, the first wire portion is electrically connected to the second wire portion, and a width of the first wire portion in the second direction is less than a width of the second wire portion in the second direction;

wherein the first wire portion comprises a lead extending in the first direction; and the second wire portion comprises two leads extending in the first direction, the two leads comprised in the second wire portion being connected in parallel.

2. The touch panel of claim 1, wherein the two leads comprised in the second wire portion are equal in width in the second direction.

3. The touch panel of claim 2, wherein the lead comprised in the first wire portion and each of the leads comprised in the second wire portion are equal in width in the second direction.

4. The touch panel of claim 1, wherein a width, in the second direction, of the lead comprised in the first wire portion is equal to a width, in the second direction, of the second touch wire.

5. A display panel comprising a touch panel, the touch panel comprising:
- a plurality of touch electrodes, the touch electrodes being arranged in a first direction to form a plurality of touch electrode columns, the plurality of touch electrode columns being arranged in a second direction, and the first direction and the second direction being intersected;
- a bonding region located on a side of the touch electrodes in the first direction;
- a plurality of touch wires, one touch wire being correspondingly electrically connected to one touch electrode; the touch wires extending in the first direction, and being respectively electrically connected to the bonding region; a length, in the first direction, of a touch wire electrically connected to a touch electrode closer to the bonding region being less than a length, in the first direction, of a touch wire electrically connected to a touch electrode further away from the bonding region; wherein,
- each of the touch electrode columns comprises n touch electrodes, a touch group is formed by an ith touch electrode and an n-i+1th touch electrode in a sequence from near to far from the bonding region, and touch wires electrically connected to two touch electrodes in a same touch group are arranged adjacently; n is an integer greater than or equal to 2, and i is an integer from 1 to n, respectively;
- the display panel further comprising:
- a base substrate;
- a driving line layer located on a side of the base substrate;
- an electroluminescent layer located on a side, away from the base substrate, of the driving line layer;
- an encapsulation layer located on a side, away from the driving line layer, of the electroluminescent layer;
- wherein the touch panel is located on a side, away from the electroluminescent layer, of the encapsulation layer, comprising:
- an isolation layer located on a side, away from the electroluminescent layer, of the encapsulation layer;
- a first touch metal layer located on a side, away from the encapsulation layer, of the isolation layer;
- a touch insulating layer located on a side, away from the isolation layer, of the first touch metal layer;
- a second touch metal layer located on a side, away from the first touch metal layer, of the touch insulating layer; and
- a touch protection layer located on a side, away from the touch insulating layer, of the second touch metal layer; wherein,
- the touch wires are located in the first touch metal layer, the touch electrodes are located in the second touch metal layer, and the touch wires are correspondingly electrically connected to the corresponding touch electrodes through via holes of the touch insulating layer.

6. The display panel of claim 5, wherein each of the first touch metal layer and the second touch metal layer adopts stacked multi-layer metal;
- the first touch metal layer and the second touch metal layer are equal in thickness; and
- a thickness of the first touch metal layer is in a range of 3,000 angstrom to 5,000 angstrom.

7. The display panel of claim 5, wherein in the same touch group, a touch wire electrically connected to a touch electrode further away from the bonding region is a first touch wire, and a touch wire electrically connected to a touch electrode closer to the bonding region is a second touch wire; and the first touch wire comprises a first wire portion and a second wire portion, the first wire portion is electrically connected to the second wire portion, and a width of the first wire portion in the second direction is less than a width of the second wire portion in the second direction.

8. The display panel of claim 7, wherein the first wire portion comprises a lead extending in the first direction; and the second wire portion comprises two leads extending in the first direction, the two leads comprised in the second wire portion being connected in parallel.

9. The display panel of claim 8, wherein the two leads comprised in the second wire portion are equal in width in the second direction.

10. The display panel of claim 9, wherein the lead comprised in the first wire portion and each of the leads comprised in the second wire portion are equal in width in the second direction.

11. The display panel of claim 8, wherein a width, in the second direction, of the lead comprised in the first wire portion is equal to a width, in the second direction, of the second touch wire.

12. The display panel of claim 7, wherein the first wire portion comprises a lead extending in the first direction; the second wire portion comprises a lead extending in the first direction; and
- a width, in the second direction, of the lead comprised in the first wire portion is less than a width, in the second direction, of the lead comprised in the second wire portion.

13. The display panel of claim 12, wherein the width, in the second direction, of the lead comprised in the first wire portion is equal to a width, in the second direction, of the second touch wire.

14. A display device, comprising a display panel comprising a touch panel, the touch panel comprising:
- a plurality of touch electrodes, the touch electrodes being arranged in a first direction to form a plurality of touch electrode columns, the plurality of touch electrode columns being arranged in a second direction, and the first direction and the second direction being intersected;
- a bonding region located on a side of the touch electrodes in the first direction;
- a plurality of touch wires, one touch wire being correspondingly electrically connected to one touch electrode; the touch wires extending in the first direction, and being respectively electrically connected to the bonding region; a length, in the first direction, of a touch wire electrically connected to a touch electrode closer to the bonding region being less than a length, in the first direction, of a touch wire electrically connected to a touch electrode further away from the bonding region; wherein, each of the touch electrode columns comprises n touch electrodes, a touch group is formed by an ith touch electrode and an n-i+1th touch electrode in a sequence from near to far from the bonding region, and touch wires electrically connected to two touch electrodes in a same touch group are arranged adjacently; n is an integer greater than or equal to 2, and i is an integer from 1 to n, respectively;

the display panel further comprising:

a base substrate;

a driving line layer located on a side of the base substrate;

an electroluminescent layer located on a side, away from the base substrate, of the driving line layer;

an encapsulation layer on located on a side, away from the driving line layer, of the electroluminescent layer;

wherein the touch panel is located on a side, away from the electroluminescent layer, of the encapsulation layer, comprising:

an isolation layer located on a side, away from the electroluminescent layer, of the encapsulation layer;

a first touch metal layer located on a side, away from the encapsulation layer, of the isolation layer;

a touch insulating layer located on a side, away from the isolation layer, of the first touch metal layer;

a second touch metal layer located on a side, away from the first touch metal layer, of the touch insulating layer; and a touch protection layer located on a side, away from the touch insulating layer, of the second touch metal layer; wherein, the touch wires are located in the first touch metal layer, the touch electrodes are located in the second touch metal layer, and the touch wires are correspondingly electrically connected to the corresponding touch electrodes through via holes of the touch insulating layer.

* * * * *